(No Model.)
H. T. PYCROFT.
CURTAIN TASSEL ATTACHMENT.
No. 603,540. Patented May 3, 1898.
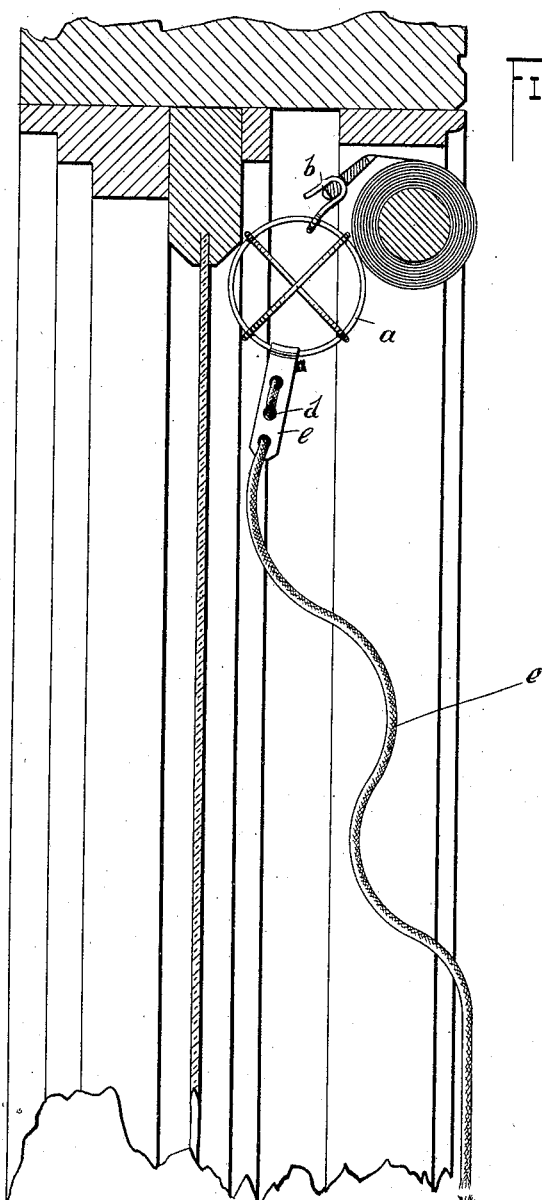
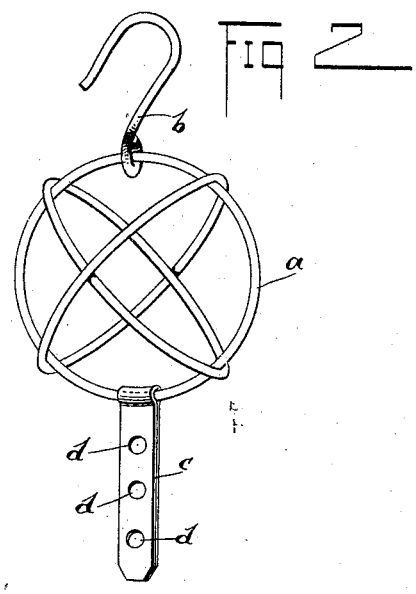
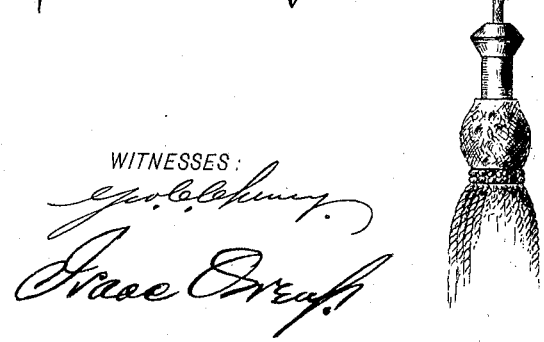
WITNESSES:
INVENTOR
H. T. Pycroft.
BY
ATTORNEYS.

UNITED STATES PATENT OFFICE.

HENRY THOMAS PYCROFT, OF AUCKLAND, NEW ZEALAND.

CURTAIN-TASSEL ATTACHMENT.

SPECIFICATION forming part of Letters Patent No. 603,540, dated May 3, 1898.

Application filed October 15, 1897. Serial No. 655,291. (No model.)

*To all whom it may concern:*

Be it known that I, HENRY THOMAS PYCROFT, a subject of the Queen of Great Britain, and a resident of Auckland, New Zealand, have invented a new and useful Improvement in Curtain-Tassel Attachments, of which the following is a specification.

This invention is a device adapted to be attached to spring-roller shades to prevent the shade cord and tassel from being accidentally wound around the roller by the action of the spring.

This specification is the disclosure of one form of my invention, while the claim defines the actual scope of the invention.

Reference is to be had to the accompanying drawings, forming a part of this specification, in which similar characters of reference indicate corresponding parts in both figures.

Figure 1 is a vertical section of the window shade and curtain with my invention applied thereto, and Fig. 2 is an enlarged perspective view of the invention.

The device consists in a plurality (preferably three) of metallic rings $a$, soldered or otherwise rigidly secured with each other, so as to form a globe. This globe may be covered or otherwise ornamented, as desired. Pivotally attached to one of the rings is a hook $b$, and the same ring carries at a diametrically opposite point a metallic plate $c$, bent double, so as to be secured to the ring, and having in each end portion three openings $d$, such openings respectively registering with each other, so that the curtain-cord $e$ may be passed through the openings to be secured thereto.

The hook $b$ is connected with the stiffening-rail at the bottom of the window-shade, as shown in Fig. 1. When so arranged, the ball formed by the rings $a$ will engage with the window-sash and the shade-roller and prevent the shade from being wound more than necessary. The device will also prevent the cord $e$ from being wound around the shade to the great annoyance and inconvenience of persons concerned.

Having thus fully described my invention, I claim as new and desire to secure by Letters Patent—

A shade attachment having a series of rings secured to each other to form a globular structure, a hook attached to one of the rings, and a plate bent over one of the rings at a point removed from the hook, the plate having two portions lying against each other, and said portions being perforated to receive a cord.

In testimony that I claim the foregoing as my invention I have signed my name, in presence of two witnesses, this 2d day of September, 1897.

HENRY THOMAS PYCROFT.

Witnesses:
O. NICHOLSON,
GEO. A. GRIBBIN.